June 25, 1968  T. J. O'CONNOR  3,389,473
SINE BAR
Original Filed June 24, 1963  2 Sheets-Sheet 1
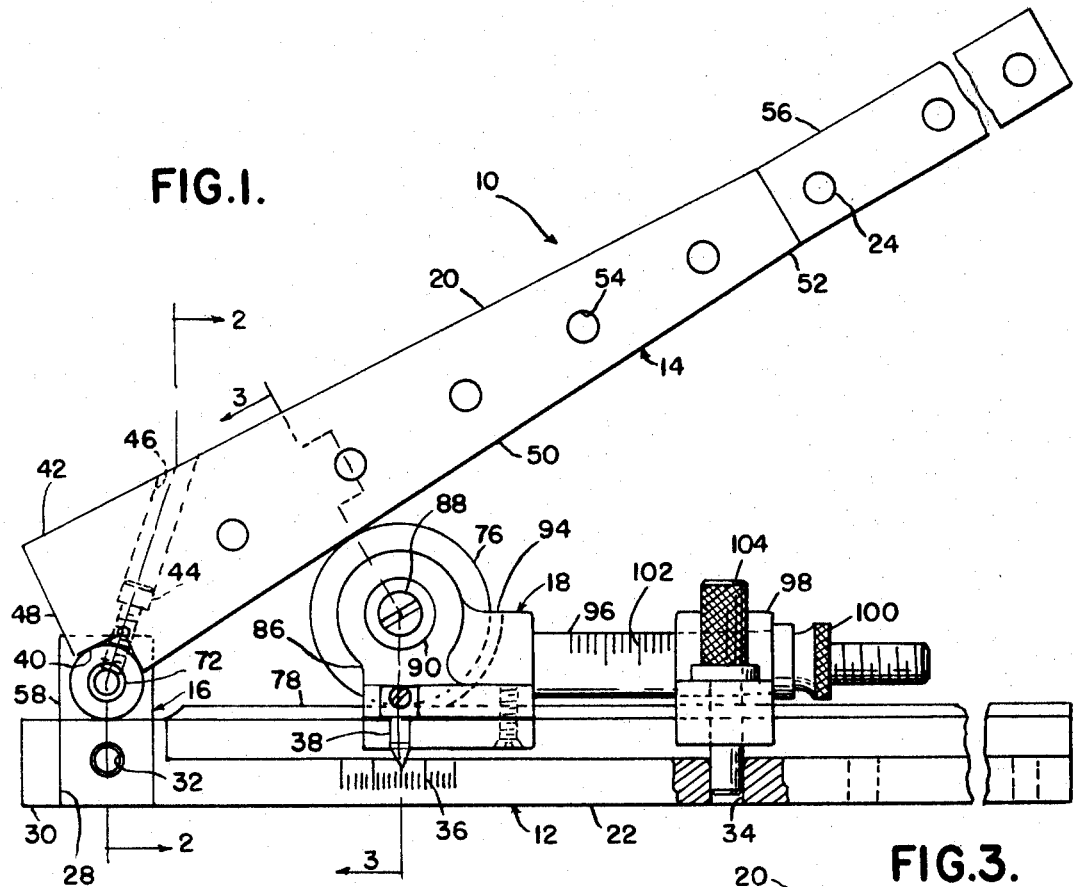
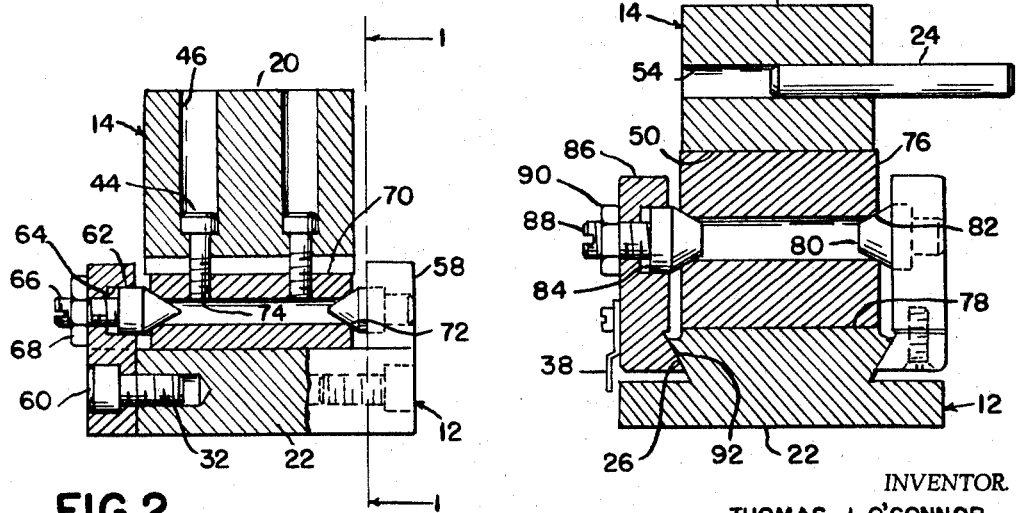
INVENTOR.
THOMAS J. O'CONNOR
BY
*Whittemore*
*Hulbert & Belknap*
ATTORNEYS June 25, 1968 T. J. O'CONNOR 3,389,473
SINE BAR
Original Filed June 24, 1963 2 Sheets-Sheet 2
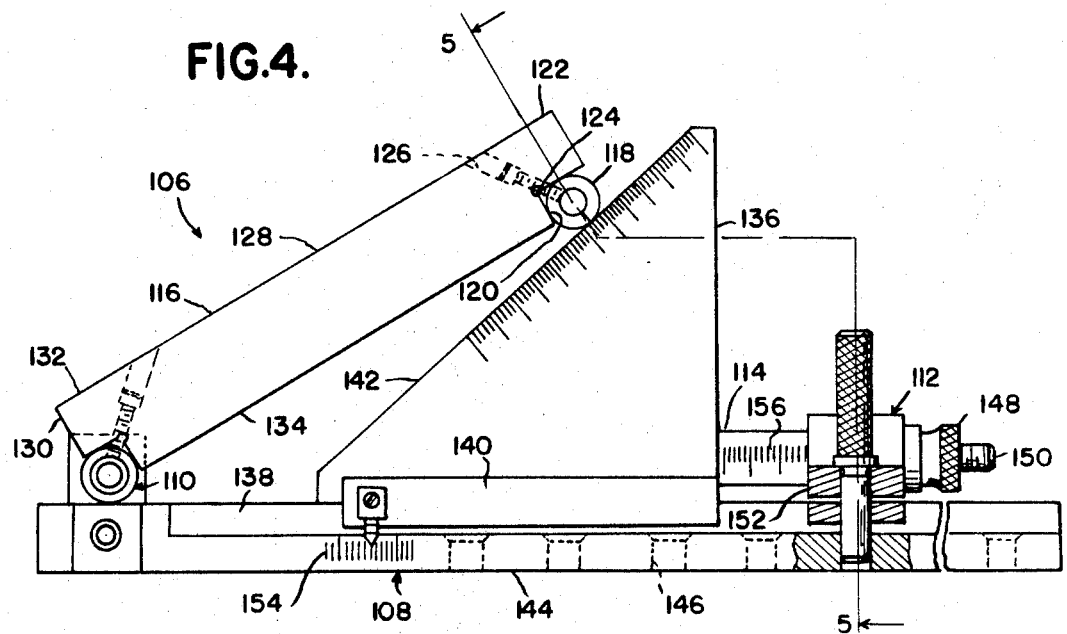
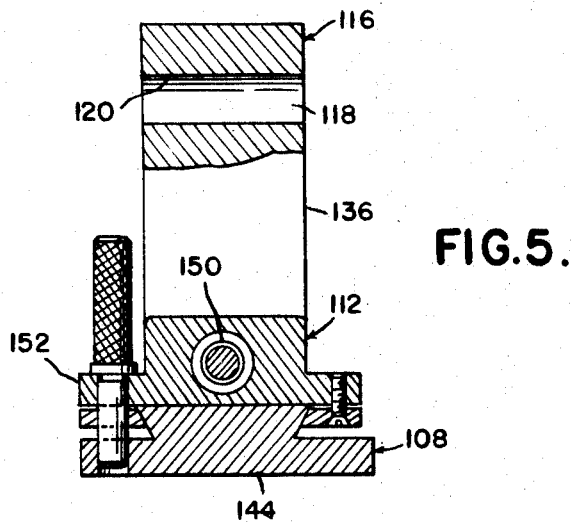
INVENTOR.
THOMAS J. O'CONNOR
BY Whittemore
Hulbert & Belknap
ATTORNEYS

United States Patent Office 3,389,473
Patented June 25, 1968

3,389,473
SINE BAR
Thomas J. O'Connor, 100 Morgan Road,
Ann Arbor, Mich. 48104
Continuation of application Ser. No. 289,875, June 24, 1963. This application Apr. 17, 1967, Ser. No. 631,565
3 Claims. (Cl. 33—174)

ABSTRACT OF THE DISCLOSURE

A sine bar including means for first adjusting the angular position of the angle plate relative to the base plate of the sine bar in coarse adjustments and separate means for subsequently adjusting the angular position of the angle plate in fine adjustments, including an angle varying member movable along the base plate of the sine bar toward the pivoted side thereof, pin and slot means for securing the member in coarse predetermined positions and screw and nut means for subsequently moving the member into any position between the coarse adjustment positions. In one embodiment of the invention the angle varying member is a roller positioned between the base plate and angle plate of the sine bar, while in another embodiment the movable member is an inclined plane. Pegs are provided extending horizontally from the angle plate of the sine bar at predetermined locations therealong for determination of height with the angle plate in different angular positions.

---

The present application is a continuation of my co-pending application, Ser. No. 289,875, filed June 24, 1963.

This invention relates to sine bars and refers more particularly to a sine bar so constructed and arranged that other precision instruments, such as Johansson blocks are not required in the use thereof.

In the past sine bars have generally been constructed so that separate precision structures, such as Johansson blocks, for establishing a predetermined height have been necessary in the use thereof. Johansson blocks and other structures for independently establishing a predetermined height are relatively expensive. The necessity for use of Johansson blocks or similar precision structures in conjunction with sine bars is therefore objectionable.

Further, sine bars of the past have included no means by which height measurements could be independently established thereby.

It is therefore an object of the invention to provide improved sine bar structure.

Another object is to provide sine bar structure requiring no Johansson blocks or similar separate height establishing structure in use.

Another object is to provide a sine bar including a lower, base plate and an upper, angle establishing plate which are pivotally secured together along one side and adjusting means positioned between the base and angle plates movable toward and away from the pivoted sides thereof for varying the angle of the top surface of the angle plate with respect to the bottom surface of the base plate in a controlled manner.

Another object is to provide sine bar structure as set forth above wherein the adjusting means includes means for coarsely adjusting the position thereof relative to the pivoted sides of the base and angle plate in predetermined increments and separate means for finely adjusting the position thereof in uniform movement between said predetermined increments.

Another object is to provide sine bar structure as set forth above including means operable in conjunction with the angle plate thereof for independently establishing predetermined heights.

Another object is to provide sine bar structure as set forth above wherein the adjusting mechanism includes a roller movable in contact with the upper surface of the base plate and the lower surface of the angle plate of the sine bar.

Another object is to provide sine bar structure as set forth above wherein the adjusting mechanism includes a triangular member movable toward and away from the pivoted sides of the base and angle plate on a slide provided in the base plate having an inclined surface engaged with a bearing carried by the angle plate.

Another object is to provide sine bar structure as set forth above wherein the means for establishing predetermined heights comprises a plurality of pegs positioned in holes spaced longitudinally of one side of the angle plate of the sine bar.

Another object is to provide sine bar structure as set forth above wherein the means for coarsely adjusting the position of the adjusting mechanism comprises a plurality of spaced apart openings in the base plate, a single opening through the adjusting mechanism and an adjusting pin inserted through the opening in the adjusting mechanism and into one of the openings in the base plate.

Another object is to provide sine bar structure as set forth above wherein the means for finely adjusting the position of the adjusting mechanism comprises a yoke having an opening extending therethrough positioned on the base plate, a nut secured to said yoke over said opening for rotation relative to said yoke and a threaded shaft extending through said yoke engaged with said nut and secured to a movable member engaged with the angle plate.

Another object is to provide sine bar structure which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a partly broken away partial elevation view of sine bar structure constructed in accordance with the invention viewed along the line 1—1 of FIGURE 2.

FIGURE 2 is a partial section view of the sine bar structure illustrated in FIGURE 1 taken substantially on the line 2—2 in FIGURE 1.

FIGURE 3 is a partial section view of the sine bar structure illustrated in FIGURE 1 taken substantially on the line 3—3 in FIGURE 1.

FIGURE 4 is a partly broken away, elevation view of modified sine bar structure similar to the elevation view of the sine bar structure illustrated in FIGURE 1.

FIGURE 5 is a partial section view of the modified sin bar structure illustrated in FIGURE 4 taken substantially on the line 5—5 in FIGURE 4.

With particular reference to the figures of the drawings, one embodiment of the present invention will now be considered in detail.

The sine bar 10 illustrated in FIGURES 1–3 includes a lower base plate 12, an upper angle plate 14 pivotally secured to the base plate 12 by pivot structure 16 and adjusting mechanism 18 positioned between the base plate 12 and angle plate 14.

In operation the adjusting means 18 is moved toward and away from the pivot structure 16 to vary the angle which the upper surface 20 of the angle plate 14 makes with the lower surface 22 of the base plate 12 in coarse and fine adjustments which provide complete angular movement of the surface 20 with respect to the surface 22. In addition heights may be exactly determined from the pegs 24 supported by the upper plate 14.

More specifically the base plate 12 is elongated and substantially rectangular and is provided with a dovetail track 26 on the upper surface thereof on which the adjusting mechanism 18 reciprocates. Recesses 28 are provided in end 30 of the base plate 22 to receive brackets 58 of the pivot structure 16, as shown in FIGURES 1 and 2. Threaded openings 32 are provided in each of the recesses 28 to facilitate securing of the brackets 58 within the recesses 28.

Coarse adjustment of the adjusting means 18 is provided by the openings 34 in the base plate 22 spaced longitudinally thereof, as shown in FIGURE 3, at increments equal to, for example, ten degrees difference in angle between the surface 20 of the angle plate 14 and the surface 22 of the base plate 12. A scale 36 is provided on one side of the base plate 12 which in conjunction with the pointer 38 of the adjusting means 18 will provide an indication of the angle between the surface 20 of the angle plate 14 and the surface 22 of the base plate 12.

The angle plate 14, as shown best in FIGURE 1, includes a recess 40 at end 42 in which part of the pivot structure 16 is secured by means of the bolts 44 in stepped openings 46 which extend through the end 42 of the angle plate 14 into the recess 40.

The upper surface 20 of the angle plate 14 of the sine bar 10 is flat and is constructed perpendicular to the surface 48 of the end 42 of the angle plate 14. The lower surface 50 of the angle plate 14 is inclined with respect to the surface 20 so that with the adjusting mechanism 18 moved out to the end 52 of the angle plate 14 the surface 20 will be parallel to the surface 22 of the base plate 12.

While surface 50 of the angle plate 14 of the sine bar 10 is shown straight to provide a predetermined variation of the angle between the surface 20 of the angle plate 14 and the surface 22 of the base plate 12 of the sine bar 10 in accordance with the provided scale 36, it will be understood that the surface 50 may be contoured to provide any desired angle between the surface 20 and the surface 22 for a given position of the adjusting mechanism 18.

The angle plate 14 of the sine bar 10 is further provided with transverse openings 54 therein, as best shown in FIGURE 3, which openings are spaced longitudinally thereof. Pegs 24 are positioned in the openings 54 and function as height determining pegs. Thus a chart may be provided in conjunction with the sine bar 10 indicating the height of, for example, the top of each peg for each particular angle between the lower surface 22 of the base plate 12 and the upper surface 20 of the angle plate 14. An extension 56 may be provided on the end 52 of the angle plate 14 to permit greater range of height measurements, as illustrated in FIGURE 1.

The pivot structure 16, as shown best in FIGURES 1 and 2, includes the bracket members 58 secured in the recesses 28 on each side of the lower plate 12 of the sine bar 10 by convenient means, such as the bolts 60 in conjunction with the threaded openings 32. The cone-shaped bearings 62 are secured in recesses 64 in the bracket members 58. The bearings 62 are adjustable in the recesses 64 by convenient means, such as the adjusting screws 66 and the lock nut 68.

The pivot structure further includes the cylindrical member 70 having conical bearing surfaces 72 at the opposite ends thereof engaging the bearings 62. The cylindrical bearing member 70, as shown best in FIGURE 2, is rigidly secured to the upper plate 14 of the sine bar 10 by means of the bolts 44 engaged in the threaded openings 74 in the bearing member 70. Thus the end 30 of the lower plate 12 is pivotally secured to the end 42 of the upper plate 14 of the sine bar 10.

The adjusting mechanism 18 includes the roller 76 which is movable along the upper surface 78 of the lower plate 12 of the sine bar 10 in engagement with the lower surface 50 of the upper plate 14 of the sine bar 10 to vary the angle which the upper surface 20 of the upper plate 14 makes with the lower surface 22 of the lower plate 12. The roller 76 is supported by the conical bearings 80 engaged with the conical bearing surfaces 82 provided on the roller 76, as shown best in FIGURE 3. Bearings 80 are supported in recesses 84 in the side portions 86 of slide 94, as illustrated best in FIGURE 3.

One of the conical bearings 80 is adjustable axially of the roller 76 by means of the adjusting screw 88 and nut 90 which may be secured to one of the side portions 86 by convenient means. The side portions 86 are provided with end portions 92 cooperable with the dovetail track 26 to guide the adjusting mechanism 18 in reciprocal movement toward and away from the pivot structure 16. One of the end portions 92 is removable to facilitate mounting of the adjusting mechanism 18 on track 26.

The slide 94 is rigidly secured to the shaft 96 which is movable axially with respect to the yoke 98 on rotation of the adjusting nut 100. The axial adjusting mechanism for providing movement of the shaft 96 on rotation of the adjusting member 100 may be the usual micrometer adjusting structure.

The scale 102 is provided in conjunction with the shaft 96 to provide an indication of the fine adjustment of the position of roller 76 and if desired may be calibrated in terms of angles or portions of angles, such as minutes and seconds thereof between the upper surface 20 of the angle plate 14 and the lower surface 22 of the base plate 12 of the sine bar 10 in conjunction with proper contouring of surface 50 of angle plate 14. The adjustment of the shaft 96 may, for example, permit movement of the surface 20 with respect to the surface 22 through a total angle of, for example, ten degrees.

A coarse adjustment of the angle between the surface 20 and the surface 22 is accomplished with the adjusting mechanism 18 by removing the pin 104 from one of the openings 34 in the base plate 12 and moving the mechanism 18 a sufficient distance to permit reengagement of the pin 104 in a different opening 34. As previously indicated the openings 34 are spaced longitudinally of the base plate 12 a sufficient distance to provide a coarse adjustment of, for example, ten degrees angular difference between the surfaces 20 and 22 between each opening 34.

Thus in operation of the sine bar 10 an angle between the upper surface 20 of the angle plate 14 and the lower surface 22 of the base plate 12 is selected. The angle plate 14 is pivoted about the pivot structure 16 into a position such that the angle between the surface 20 and the surface 22 is larger than that desired, the pin 104 of the adjusting mechanism 18 is removed from the opening 34 in the base plate 12, and the adjusting mechanism 18 is moved along the dovetail track 26 to permit reinsertion of the pin 104 into an opening 34 to provide a coarse adjustment of the angle between the surfaces 20 and 22. The upper plate 14 of the sine bar 10 is then pivoted about the pivot structure 16 in a clockwise direction until the surface 50 contacts the roller 76. The adjusting nut 10 is then rotated to axially adjust the shaft 96 to provide the exact desired angle between the surfaces 20 and 22, as indicated on the fine adjustment scale 102 on the shaft 96.

If it is required to provide a height reference a similar adjustment of the sine bar 10 to that considered above is made to provide an angle between the surfaces 20 and 22, such that a predetermined peg 24 will provide the desired height reference. As previously indicated a separate chart may be provided to indicate height reference for each pin 24 for each different angular position between the surface 20 and the surface 22.

In the modified sine bar structure 106 the base plate 108 and pivot structure 110 may be exactly the same as that of the sine bar 10. Similarly the portion of the adjusting apparatus 112 to the right of the shaft 114 is the same as the portion of the adjusting mechanism 18 to the right of the shaft 96. This structure will not therefore be considered in detail.

The angle plate 116 of the sine bar 106 differs from the angle plate 14 of the sine bar 10 in that a second bearing cylinder 118 is secured in a recess 120 at the end 122 thereof by convenient means, such as bolts 124 positioned in stepped opening 126. The upper surface 128 of the angle plate 116 of the sine bar 106 is flat and may be constructed at any desired angle with respect to the end surface 130 of end 132 of the sine bar 106. The lower surface 134 of the angle plate 116, as shown, is flat but may be provided at any desired angle with respect to the upper surface 128.

The portion of the adjusting mechanism 112 to the left of shaft 114, as shown in FIGURE 4, includes a triangular member 136 which is guided on dovetail track 138 by the members 140 which may be secured to the triangular member 136 by convenient means (not shown). The surface 142 of the triangular member 136 may be contoured as desired to provide predetermined angular positions of the surface 128 of the angle plate 116 with respect to the lower surface 144 of the base plate 108 for a particular position of the triangular member 136 with respect to the pivot structure 110.

As shown the surface 142 of the triangular member 136 is substantially flat and makes an angle of forty-five degrees with respect to the surface 144 of the base plate 108. Adjustment of the sine bar 106 illustrated in FIGURES 4 and 5 is therefore limited to the provision of a forty-five degree angle between the surfaces 128 and 144. Adjustment through any predetermined angular relationship between the surfaces 128 and 144 may be accomplished by selected inclination of surfaces 128 and 142, as will be readily recognized by those skilled in the art.

The use of the sine bar 106 illustrated in FIGURES 4 and 5 is similar to the use of the sine bar illustrated in FIGURES 1–3. Thus a coarse adjustment of the angle between surfaces 128 and 144 is provided on movement of the adjusting apparatus 112 in increments controlled by the position of the openings 146 in the base member 108 of the sine bar 106 while fine adjustment is provided by the adjusting nut 148 and threaded extension 150 on shaft 114 in conjunction with yoke 152.

As before the fine adjustment may be accomplished by a micrometer adjustment. Again the coarse adjustment may be indicated on the scale 154 on base plate 108 while the fine adjustment may be indicated on the micrometer scale 156 on shaft 114.

While one embodiment and a modification of the present invention have been considered in detail, other modifications and embodiments are contemplated. It is therefore the intention to include all modifications and embodiments as are defined by the appended claims within the scope of the invention.

I claim:

1. A sine bar comprising an elongated, substantially flat, generally rectangular base plate including a track on the upper surface thereof, an elongated, substantially flat, generally rectangular angle plate, pivot structure securing one end of the base plate and the angle plate together for relative angular movement therebetween, adjusting means secured to said base plate including an angle varying member engaged with both the base plate and angle plate for movement along the track toward and away from the pivot connection between the base and angle plates to vary the angular relation thereof, said adjusting mechanism further including fine adjusting means for varying the position of said angle varying member gradually between selected points along said track comprising a yoke selectively positioned at any one of said points and a shaft secured to said angle varying member having a threaded extension thereon and an adjusting nut journalled in said yoke and operably associated with the threaded extension for positioning the threaded extension axially between said selected points.

2. Structure as set forth in claim 1, wherein the angle varying member comprises a roller secured to the shaft for movement therewith and rotation relative thereto.

3. Structure as set forth in claim 1, wherein the angle varying member comprises an inclined plane secured to the shaft and movable therewith.

References Cited
UNITED STATES PATENTS

| | | | |
|---|---|---|---|
| 761,328 | 5/1904 | Spalding | 33—165 |
| 1,323,707 | 12/1919 | Mackey | 33—165 |
| 1,379,878 | 5/1921 | Rouanet | 33—165 |
| 1,409,343 | 3/1922 | Karasick | 33—174 |
| 2,113,287 | 4/1938 | Baldenhofer | 33—174 X |
| 2,669,027 | 2/1954 | Wilson | 33—174 |
| 3,090,127 | 5/1963 | Goyeneche | 33—174 |

SAMUEL S. MATTHEWS, *Primary Examiner.*

UNITED STATES PATENT OFFICE
CERTIFICATE OF CORRECTION

Patent No. 3,389,473                                    June 25, 1968

Thomas J. O'Connor

It is certified that error appears in the above identified patent and that said Letters Patent are hereby corrected as shown below:

In the heading to the printed specification, lines 3 and 4, "100 Morgan Road, Ann Arbor, Mich. 48104" should read -- Ann Arbor, Mich., assignor of one-half to Dale R. Small, Detroit, Mich. --.

Signed and sealed this 11th day of November 1969.

(SEAL)
Attest:

Edward M. Fletcher, Jr.                          WILLIAM E. SCHUYLER, JR.
Attesting Officer                                          Commissioner of Patents